United States Patent Office 3,414,607
Patented Dec. 3, 1968

3,414,607
NOVEL CYCLOPROPANECARBOXYLIC
ACID ESTERS
Keimei Fujimoto, Minoo-shi, Yositosi Okuno, Nishinomiya-shi, Kenzo Ueda, Toyonaka-shi, Sadao Horie, Suita-shi, Toshio Mizutani, Ikeda-shi, and Katsuji Nodera, Minoo-shi, Japan, assignors to Sumitomo Chemical Company, Ltd., Osaka, Japan, a corporation of Japan
No Drawing. Filed Feb. 15, 1966, Ser. No. 527,504
Claims priority, application Japan, Feb. 19, 1965, 40/9,525; Feb. 20, 1965, 40/9,851; Dec. 29, 1965, 40/81,792; Jan. 6, 1966, 41/769
5 Claims. (Cl. 260—468)

ABSTRACT OF THE DISCLOSURE

A process for the production of cyclopropanecarboxylic acid esters by reacting chrysanthemum monocarboxylic acid or its functional derivatives with a benzyl derivative. The product of this reaction has insecticidal properties.

---

This invention relates to novel cyclopropanecarboxylic acid esters, to a process for producing the same and to insecticidal compositions containing the same.

More specifically, it relates to novel cyclopropanecarboxylic acid esters represented by the general formula of

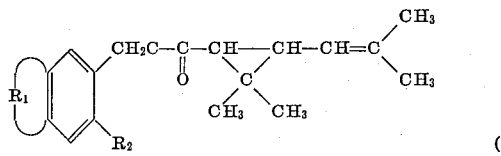

(I)

wherein $R_1$ is a lower alkylene residue and $R_2$ is hydrogen atom or a lower alkyl radical having from 1 to 3 carbon atoms, to a process for producing the same which comprises esterifying a chrysanthemum monocarboxylic acid or its functional derivative with a benzyl derivative represented by the general formula of

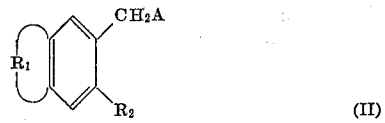

(II)

wherein $R_1$ and $R_2$ have the same meanings as defined above and A is hydroxy radical or chlorine atom, according to the general esterifying procedure, and to insecticidal compositions containing the same as the effective ingredient.

Among numerous insecticides being used now, nothing is more reliable than pyrethrum extract (containing pyrethrin) or allethrin in rapidity and power of insecticidal action coupled with lack of toxicity to mammals. However, it is a disadvantage of these materials that the production costs are relatively expensive and on this account their uses are limited to some extent now.

Accordingly, it is an object of the present invention to provide novel cyclopropanecarboxylic acid esters which have strong insecticidal effectiveness to house and agricultural insects, besides low toxicites to mammals and plants, and which can be commercially produced at relatively low cost. It is another object of the present invention to provide a process for producing such novel esters by a commercially available procedure. It is another object to provide insecticidal compositions containing such an ester as the effective ingredient.

It is still another object to provide insecticidal compositions possessing superior effectiveness to larvae of northern house mosquitos, compared with that of pyrethrum extract and allethrin.

The present inventors have now found that these and other objects may be accomplished by the provision of the novel cyclopropanecarboxylic acid esters represented by the general formula of

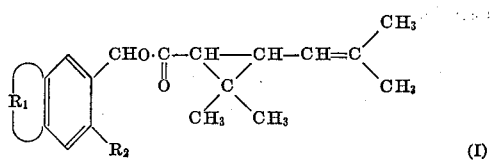

(I)

wherein $R_1$ is a lower alkylene residue and $R_2$ is hydrogen atom or a lower alkyl radical having from 1 to 3 carbon atoms, and of the process which comprises esterifying a chrysanthemum monocarboxylic acid in itself or in the form of a functional derivative, such as its salt, its acid chloride or its acid anhydride, with a benzyl derivative represented by the general formula of

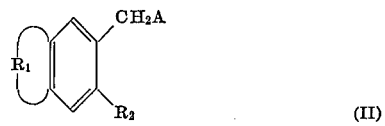

(II)

wherein $R_1$ and $R_2$ have the same meanings as defined above and A is hydroxy radical in itself or in the form of the derivative wherein A is chlorine atom, according to the conventional esterifying procedure, and recovering the product, thereby to obtain the novel cyclopropanecarboxylic acid esters, and of insecticidal composition containing such an ester as the effective ingredient.

Among the cyclopropanecarboxylic acid esters represented by the general Formula I, 6-chrysanthemoxymethyl-1,2,3,4-tetrahydronaphthalene

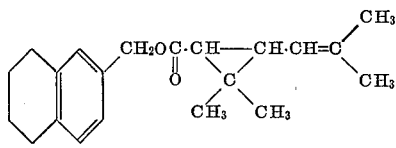

5-chrysanthemoxymethylindane,

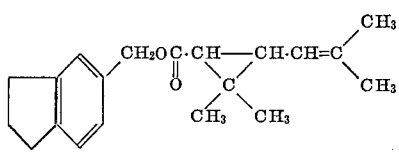

6 - chrysanthemoxymethyl - 7 - methyl-1,2,3,4-tetrahydronaphthalene,

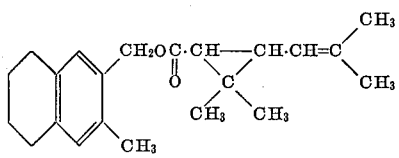

5-chrysanthemoxymethyl-6-methylindane,

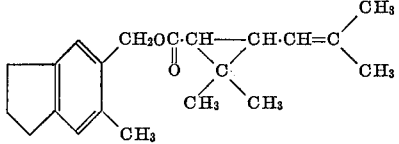

5-chrysanthemoxymethyl-6-ethylindane,

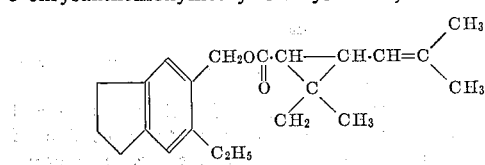

and 6-chrysanthemoxymethyl-7-propyl-1,2,3,4-tetrahydronaphthalene,

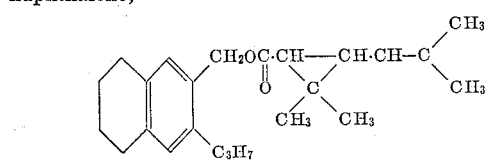

are illustrated as the compounds particularly useful to attain the objects of the invention, but the invention is by no means limited to only such compounds.

In the production of the cyclopropanecarboxylic acid esters (I) by esterifying the chrysanthemum monocarboxylic acid or its derivatives with a benzyl derivative (II), when 3,4-alkylene benzyl alcohol (A is a hydroxy radical) itself is used, it is contacted with the chrysanthemum monocarboxylic acid chloride in the presence of a basic condensing agent such as tertiary organic bases, e.g., pyridine, triethylamine and the like, at a temperature close to room temperature, or heated with the chrysanthemum monocarboxylic acid anhydride, preferably in the presence of an inert solvent, thereby to obtain the cyclopropanecarboxylic acid esters (I) with a high production yield.

When 3,4-alkylenebenzyl chloride (A is a chlorine atom) is used, it is contacted with the chrysanthemum monocarboxylic acid in the presence of a basic condensing agent, such as tertiary organic bases, e.g. pyridine and triethylamine, or such as alkali metal carbonates or hydroxides, e.g. potassium carbonate and sodium hydroxide, and preferably in the presence of an inert solvent, or with the salt of the chrysanthemum monocarboxylic acid formed with a basic agent as mentioned above, thereby to obtain the cyclopropanecarboxylic acid esters (I).

The benzyl compounds (II) employed in the present invention may be prepared by chloromethylation of the corresponding alkylenebenzenes with formaldehyde and hydrogen chloride, together with a small amount of by-produced 2,3-alkylenebenzyl chlorides. Thus obtained 3,4-alkylenebenzyl chlorides may be converted to 3,4-alkylenebenzyl alcohols by acetylation, followed by hydrolysis.

There are several kinds of stereoisomers in the cyclopropanecarboxylic acid ester (I) produced in accordance with the present invention, but it is needless to say that all the isomers represented by the structural Formula I are included in the scope of the present invention.

As above-mentioned, the present compounds can be produced at relatively less-expensive cost and possess superior insecticidal activity against insects injurious to sanitation, such as house flies, mosquitoes, cockroaches and the like. Moreover, they can be used without considering any harm to mammals. Accordingly, they have a widespread use particularly for preventive measures against epidemics, but they are of extreme importance for preventing and exterminating injurious insects in corn storage, agriculture, and forestry. It is particularly a superior point of the present compounds that they can be used at will to crops before harvesting, home gardening, green house culture and packaging materials for foods because of the harmlessness to mammals.

The present compound may be formulated into oil solution, emulsifiable concentrate, aerosol, wettable powder, mosquito coil, granule, bait, dust containing one or more attractants and other voluntary preparations by use of common auxiliary agents for the insecticides.

Moreover, depending upon the type of formulation, i.e. in case of dust preparation, bait, mosquito coil or the like, it may be conveniently formulated using a preliminarily prepared solution containing the present compound in an organic solvent such as xylene, methylnaphthalene, acetone or the like, according to the method well known to those skilled in the art.

It is also possible to increase the effectiveness of the present insecticides by combined use of a synergist such as alpha-[2-(2-butoxyethoxy)ethoxy] - 4,5 - methylenedioxy-2-propyltoluene {common name; piperonyl butoxide}, 1,2 - methylenedioxy-4-[2-(octylsulfinyl)propyl]benzene {common name; sulfoxide}, N-[2-ethylhexyl]-bicyclo [2,2,1]hept-5-en-2,3-dicarboximide {trade name; MGK–264} and the like.

If desired, the present compounds may be employed for the preparation of multi-purpose insecticidal compositions in combination with other active ingredient or ingredients, such as organic chlorine type insecticides, organic phosphor type insecticides, carbamate type insecticides, pyrethroid type insecticides, fungicides, acaricides, herbicides, fertilizers, and other agricultural chemicals.

The present invention may be more fully understood from the following examples which are offered by way of illustration and not by way of limitation. Examples 1 to 9 are directed to methods for producing cyclopropanecarboxylic acid esters and Examples 10 to 31 are directed to methods for preparing various forms of insecticidal compositions and effectiveness thereof.

Example 1

A mixture of 5.4 g. (0.03 mol) of 6-chloromethyl-1,2,3,4-tetrahydronaphthalene 6.3 g. (0.033 mol) of sodium salt of dl-cis,transchrysanthemum monocarboxylic acid and 50 ml. of acetone was stirred under reflux for 15 hours. After the mixture was cooled, the precipitated sodium chloride was filtered off. Viscous liquid remaining as residue after driving-off acetone in vacuo, was dissolved in 30 ml. of benzene. The resultant solution was washed with 10 percent aqueous solution of potassium carbonate and then with saturated aqueous solution of sodium chloride and dried over anhydrous magnesium sulfate. Removal of benzene in vacuo gave 7.0 g. of 6-dl-cis,trans-chrysanthemoxymethyl-1,2,3,4-tetrahydronaphthalene having a structural formula of

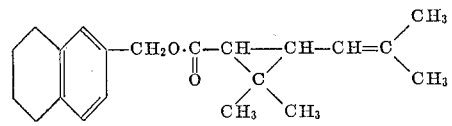

B.P. 165° C./0.19 mm. Hg and $n_D^{19}$ 1.5336.

*Elementary analysis.*—Calculated (for $C_{21}H_{28}O_2$): C, 80.6%; H, 8.71%. Found: C, 80.8%; H, 8.97%.

Example 2

A mixture of 5.0 g. (0.03 mol) of 5-chloromethylindane, 5.0 g. (0.03 mol) of dl-cis,trans-chrysanthemum monocarboxylic acid, 4.5 g. (0.045 mol) of triethylamine and 50 ml. of acetone was refluxed for 16 hours. After the mixture was cooled, precipitated triethylamine hydrochloride was filtered off and acetone was removed by distillation. The remaining viscous oily matter was dissolved in 30 ml. of benzene. The resultant solution was washed with 1 N-hydrochloric acid, saturated aqueous solution of sodium chloride, 10 percent aqueous solution of potassium carbonate and saturated aqueous solution of sodium chloride in this order and dried over anhydrous magnesium sulfate. Removal of benzene in vacuo gave 6.9 g. of 5-dl-cis,trans-chrysanthemoxymethylindane having the structural formula of

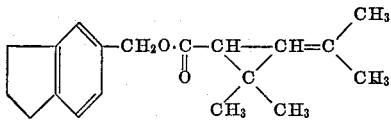

B.P. 139° C./0.15 mm. Hg and $n_D^{19}$ 1.5290.

Elementary analysis.—Calculated (for $C_{20}H_{26}O_2$): C, 80.3%; H, 8.93%. Found: C, 80.5%; H, 8.72%.

Example 3

A solution of 3.2 g. (0.02 mol) 6-hydroxymethyl-1,2,3,4-tetrahydronaphthalene and 2.4 g. (0.03 mol) of pyridine, in 15 ml. of dry benzene was mixed with another solution of 3.7 g. (0.02 mol) dl-cis,trans-chrysanthemum monocarboxylic acid chloride in 15 ml. of benzene while being cooled with ice. An exothermic reaction proceeded immediately to precipitate pyridine hydrochloride. After standing over night at room temperature, the reacted solution was washed with 1 N-hydrochloric acid, saturated aqueous solution of sodium chloride, 10 percent aqueous solution of potassium carbonate, and saturated solution of sodium chloride in this order, and dried over anhydrous magnesium sulfate. Removal of benzene and subsequent distillation in vacuo gave, as in Example 1, 5.2 g. of 6-dl-cis,trans-chrysanthemoxymethyl 1,2,3,4-tetrahydronaphthalene having B.P. of 162° C./0.15 mm. Hg and $n_D^{23}$ 1.5316.

Elementary analysis.—Calculated (for $C_{21}H_{28}O_2$): C, 80.6%; H, 9.18%. Found: C, 80.8%; H, 8.97%.

Example 4

Three grams (0.02 mol) of 5-hydroxymethylindane and 6.4 g. (0.02 mol) of dl-cis,trans-chrysanthemum monocarboxylic acid anhydride were dissolved in 30 ml. of dry toluene and the solution was refluxed for 3 hours. After cooled, the solution was washed with 10 percent aqueous solution of potassium carbonate to remove chrysanthemum monocarboxylic acid, further, washed with saturated aqueous solution of sodium chloride and dried over anhydrous magnesium sulfate. Removal of toluene by distillation and subsequent distillation in vacuo yielded, as in Example 2, 4.2 g. of 5-dl-cis,trans-chrysanthemoxymethylindane having B.P. of 139° C./0.15 mm. Hg and $n_D^{19}$ 1.5292.

Elementary analysis.—Calculated (for $C_{20}H_{26}O_2$): C, 80.8%; H, 9.07%. Found: C, 80.5%; H, 8.72%.

Example 5

A mixture of 3.9 g. (0.02 mol) of 6-chloromethyl-7-methyl-1,2,3,4-tetrahydronaphthalene, 3.4 g. (0.02 mol) of dl-trans-chrysanthemum monocarboxylic acid and 3 g. (0.03 mol) of triethylamine was dissolved in 50 ml. of methyl iso-butyl ketone and the mixture was heated under reflux for 15 hours. After the mixture was cooled, the precipitated triethylamine hydrochloride was filtered off.

Viscous liquid remaining as residue after driving-off methyl iso-butyl ketone in vacuo, was dissolved in 30 ml. of benzene, and the resultant solution was washed with 2 N hydrochloric acid, 5% aqueous solution of sodium carbonate and then with saturated aqueous solution of sodium chloride in this order, and dried over anhydrous magnesium sulfate.

Removal of benzene and distillation in vacuo gave 5.2 g. of 6-dl-trans-chrysanthemoxymethyl-7-methyl-1,2,3,4-tetrahydronaphthalene having a structural formula of

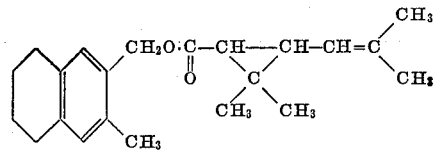

B.P. 146–150° C./0.05 mm. Hg and $n_D^{22}$ 1.5345.

Elementary analysis.—Calculated (for $C_{22}H_{30}O_2$): C, 80.94%; H, 9.26%. Found: C, 80.65%; H, 9.14%.

Example 6

A solution of 3.3 g. (0.02 mol) of 5-hydroxymethyl-6-methylindane and 2.4 g. (0.03 mol) of pyridine in 15 ml. of dry benzene was mixed with another solution of 3.7 g. (0.02 mol) of dl-cis,trans-chrysanthemum monocarboxylic acid chloride in 15 ml. of benzene while being cooled with ice.

After well mixing, the mixture was stood over night at room temperature.

The resultant solution was washed with 2 N hydrochloric acid, 5% aqueous solution of sodium carbonate and then with saturated aqueous solution of sodium chloride in this order, and dried over anhydrous magnesium sulfate. Removal of benzene and distillation in vacuo gave 5.7 g. of 5-dl-cis,trans-chrysanthemoxymethyl-6-methylindane having a structural formula of

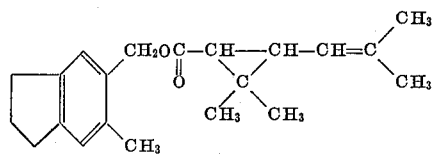

B. P. 142°–145° C./0.04 mm. Hg and $n_D^{24}$ 1.5300.

Elementary analysis.—Calculated (for $C_{21}H_{28}O_2$): C, 80.73%; H, 9.03%. Found: C, 80.67%; H, 9.03%.

Example 7

A mixture of 3.3 g. (0.02 mol) of 5-hydroxymethyl-6-methylindane and 6.4 g. (0.02 mol) of dl-cis,trans-chrysanthemum monocarboxylic acid anhydride was dissolved in 30 ml. of dry toluene and the mixture was heated under reflux for 3 hours. After cooling, the resultant solution was washed with 5% aqueous solution of sodium carbonate and saturated aqueous solution of sodium chloride in this order, and dried over anhydrous magnesium sulfate. Removal of toluene and distillation in vacuo gave 4.1 g. of 5-dl-cis,trans-chrysanthemoxymethyl-6-methylindane as same as Example 6, having B.P. 145°–149° C./0.05 mm. Hg and $n_D^{24}$ 1.5298.

Elementary analysis.—Calculated (for $C_{21}H_{28}O_2$): C, 80.73%; H, 9.03%. Found: C, 80.57%; H, 9.21%.

Example 8

A mixture of 3.9 g. (0.02 mol) of 5-chloromethyl-6-ethylindane, 3.4 g. (0.02 mol) of dl-cis,trans-chrysanthemum monocarboxylic acid and 3 g. (0.03 mol) of triethylamine was dissolved in 50 ml. of methyl isobutyl ketone and the mixture was heated for 15 hours under reflux.

Thereafter, according to the same procedure as in Example 5, the resultant solution was treated, thereby to obtain 5.3 g. of 5-dl-cis,trans-chrysanthemoxymethyl-6-ethylindane having a structural formula of

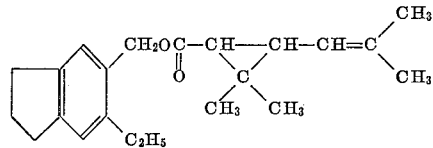

B.P. 156°–161° C./0.05 mm. Hg and $n_D^{24}$ 1.5321.

Elementary analysis.—Calculated (for $C_{22}H_{30}O_2$): C, 80.94%; H, 9.26%. Found: C, 80.70%; H, 9.17%.

Example 9

A mixture of 4.4 g. (0.02 mol) of 6-chloromethyl-1,2,3,4-tetrahydronaphthalene, 3.4 g. (0.02 mol) of dl-cis,trans-chrysanthemum monocarboxylic acid and 3 g. (0.03 mol) of triethylamine was dissolved in 3 g. (0.03 mol) of methyl isobutyl ketone and the mixture was heated for 15 hours under reflux. Thereafter, according to the same procedure as in Example 5, the resultant solution was treated, thereby to obtain 5.7 g. of 6-dl-cis,trans-chrysanthemoxymethyl - 1,2,3,4 - tetrahydronaphthalene having a structural formula of

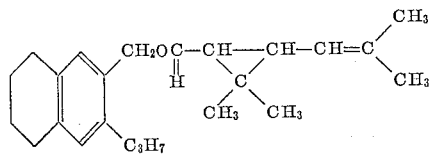

B.P. 170°–174° C./0.04 mm. Hg and $n_D^{22}$ 1.5402.

Elementary analysis.—Calculated (for $C_{24}H_{34}O_2$): C, 81.33%; H, 9.67%. Found: C, 81.18%; H, 9.62%.

Example 10

An emulsifiable concentrate was obtained by mixing and dissolving with stirring, 10 g. of 6-chrysanthemoxymethyl-1,2,3,4-tetrahydronaphthalene, (Example 1) 10 g. of a mixture of anionic surface active agents such as alkylaryl calcium sulfonate, etc. and nonionic surface active agents such as polyoxyethylene sorbitan alkylate, etc. and 80 g. of xylene.

Similarly, from 5-chrysanthemoxymethylindane (Example 2) and from allethrin, emulsifiable concentrates were also prepared.

Example 11

By dissolving 1 g. of 6-chroysanthemoxymethyl-1,2,3,4-tetrahydronaphthalene (Example 3) in refined kerosene so as to make 100 ml. in total, a one percent oil preparation was obtained.

Similarly, from 5-chrysanthemoxymethylindane (Example 4), another oil preparation was obtained.

Example 12

Zero point eight gram of 6-chrysanthemoxymethyl-1,2,3,4-tetrahydronaphthalene (Example 3) dissolved in 20 ml. of acetone was evenly mixed by stirring with 99.2 g. of mosquito coil carrier (a 2:3 mixture of powder of dried up leaf of Cryptomeria and marc). After acetone was evaporated, 100 ml. of water was added to the mixture. A mosquito coil containing 0.8 percent of an effective ingredient was obtained by moulding the sufficiently kneaded mixture, followed by drying the molded mixture.

Example 13

By dissolving 0.4 g. of 6-chrysanthemoxymethyl-7-methyl-1,2,3,4-tetrahydronaphthalene (Example 5) in refined kerosene so as to make 100 g. in total, a 0.4% oil preparation was obtained.

Example 14

By mixing and dissolving with stirring, 10 g. of 6-chrysanthemoxymethyl - 7 - methyl-1,2,3,4-tetrahydronaphthalene (Example 5), 10 g. of Sorpol SM–200 and 80 g. of xylene, a 10% emulsifiable concentrate was obtained.

Example 15

According to the same procedure as in Example 12, 0.8 g. of 6-chrysanthemoxymethyl-7-methyl-1,2,3,4-tetrahydronaphthalene (Example 5) was treated, thereby to obtain a mosquito coil.

Example 16

Five grams of Toyolignin CT (a registered trademark of Toyo Spinning Co.; lignin sulfate) and 90 g. of GSM Clay (a registered trademark of Zieglight Kogyo Co.; siliceous clay) was added to 5 g. of 6-chrysanthemoxymethyl-7-methyl-1,2,3,4-tetrahydronaphthalene (Example 5), and the mixture was thoroughly stirred in an attrition mill. Water was added thereto in an amount of 10% of the mixture.

The resulting mixture was further stirred and charged into a granulator to make into granules, which are dried in air.

Thus a granule was obtained.

Example 17

A mixture of 0.4 g. of 5-chrysanthemoxymethyl-6-methylindane (Example 6), 0.5 g. of pyrethrum extract (containing 20% pyrethrin), 1.5 g. of piperonyl butoxide, 2 g. of p,p'-dichlorodiphenyltrichloroethane, 5 g. of xylene and 5.6 g. of refined kerosene was mixed and the mixture was charged into an aerosol vessel. After the valve part was fitted up, 85 g. of a spraying agent (e.g. Freon; trademark of E. I. du Pont de Nemours & Co., Inc.; hydrocarbon fluoride, monomeric vinyl chloride, liquefied petroleum gas or the like) was charged thereinto under pressure through said valve part, thereby to obtain an aerosol.

Example 18

By mixing and dissolving with stirring, 15 g. of 5-chrysanthemoxymethyl-6-methylindane (Example 6), 10 g. of an emulsifier, a polyoxyethylenealkylaryl ether and 75 g. of xylene, a 15% emulsifiable concentrate was obtained.

Example 19

One point five grams of a disperser, an alkylsulfate and 3.5 g. of lignin were added to 50 g. of 5-chrystanthemoxymethyl-6-methylindane (Example 7), and 45 grams of kieselguhr was added thereto and the mixture was well stirred in an attrition mill, thereby to obtain wettable powder.

Example 20

By dissolving 0.6 g. of 5-chrysanthemoxymethyl-6-methylindane (Example 7) in refined kerosene so as to make 100 ml. in total, 0.6% oil preparation was obtained.

Example 21

One gram of 5-chrysanthemoxymethyl-6-ethylindane was dissolved in 20 g. of acetone and 99 g. of 300 mesh kieselguhr was added thereto.

The mixture was thoroughly stirred in an attrition mill. Removal of acetone by evaporation gave a dust preparation.

Example 22

By dissolving 0.5 g. of 5-chrysanthemoxymethyl-6-ethylindane in refined kerosene so as to make 100 ml. in total, thereby to obtain 0.5% oil preparation.

Example 23

The emulsifiable concentrates obtained in Example 10 were adjusted to the various desired test concentrations with water and each 200 ml. of them was introduced in 300 ml. glass beakers. A group of about 30 fullgrown larvae of northern house mosquitoes was liberated therein and left to stand for 24 hours in a thermostat of 25° C. Thereafter number of killed insects was examined to determine mortality. The result is shown in Table 1.

TABLE 1.—MORTALITY (PERCENT) OF FULLGROWN LARVAE OF NORTHERN HOUSE MOSQUITOES RELATIVE TO VARIOUS CONCENTRATIONS

| Insecticidal composition | 0.05 p.p.m. | 0.1 p.p.m. | 0.2 p.p.m. | 0.4 p.p.m. |
|---|---|---|---|---|
| Emulsifiable concentrate consisting of 6-chrysanthemoxymethyl-1,2,3,4-tetrahydronaphthalene | 28.7 | 42.5 | 85.8 | 90.5 |
| Emulsifiable concentrate consisting of 5-chrysanthemoxymethylindane | 11.1 | 53.9 | 78.6 | 95.1 |
| Emulsifiable concentrate consisting of allethrin | 7.9 | 29.4 | 69.6 | 91.7 |

Example 24

The oil preparations obtained in Example 11 were adjusted to the various desired concentrations with refined kerosene. Each 5 ml. of them was sprayed with a pressure of 10 lb. per sq. in. for 10 seconds by use of a Campbell's turn-table. (Campbell, F. L. and Sullivan, W. N., Soap and Sanit. Chem. 14(6), 119–125, 149

(1933).) After 20 seconds, a shutter was opened and a group of about 100 houseflies (adult) was exposed to the spray for 10 minutes and then transferred to an observation cage. After 24 hours, number of killed insects was examined to determine mortality. The result is shown in Table 2.

TABLE 2.—MORTALITY (PERCENT) AFTER 24 HOURS

| Insecticidal composition | 0.075% | 0.15% | 0.3% |
|---|---|---|---|
| Oil preparation consisting of 6-chrysan-themoxymethyl-1-1,2,3,4-tetrahydro-naphthalene | 12.5 | 60.2 | 84.9 |
| Oil preparation consisting of 5-chrysan-themoxymethylindane | 8.9 | 56.8 | 86.6 |

Example 25

The mosquito coil obtained in Example 12 was ignited at its one end and introduced in a glass cylinder (inside diameter of 20 cm., height of 43.5 cm.) of Nagasawa type sprayed fog descending apparatus (Sumio Nagasawa; Bochu Kagaku 18, 183–192, 1953) in which about 20 northern house mosquitoes had been liberated.

The ignition was continued for 5 minutes. Number of knocked down northern house mosquitoes relative to the lapse of time was examined. The result is shown in Table 3.

TABLE 3

Knock-down ratio (percent) of northern house mosquitoes relative to lapse of time.

Minutes:
1 ---------------------------------------- 0
2 ---------------------------------------- 3.7
4 ---------------------------------------- 39.2
8 ---------------------------------------- 95.0

Example 26

According to the Campbell's turn-table method and by use of a group of about 100 houseflies (adult), 5 ml. of each oil solution prepared in Examples 13, 20 and 22 was sprayed, houseflies were exposed to settling mist for 10 minutes, taken out, given feed and kept in a thermostat at a temperature of 27° C. Mortality was calculated by observing killed flies after 24 hours. The result is shown in Table 4.

TABLE 4

Insecticidal composition: Mortality (percent) after 24 hours
Oil solution in Example 13 ------------------ 87
Oil solution in Example 20 ------------------ 72
Oil solution in Example 22 ------------------ 84

Example 27

The mosquito coil obtained in Example 15 was ignited at its one end and introduced in a glass cylinder (inside diameter of 20 cm., height of 43.5 cm.) of Nagasawa type sprayed fog descending apparatus, in which about 20 northern house mosquitoes had been liberated.

After ignition continued for 5 minutes, number of knocked down northern house mosquitoes relative to the lapse of time was examined. The result is shown in Table 5.

TABLE 5

Knock-down ratio (percent) of northern house mosquitoes relative to the lapse of time.

Minutes:
1 ---------------------------------------- 9
2 ---------------------------------------- 18
4 ---------------------------------------- 35
8 ---------------------------------------- 54
16 --------------------------------------- 90

Example 28

The emulsifiable concentrates obtained in Examples 14 and 18, and wettable powder obtained in Example 19 were adjusted to the various desired test concentration and each 200 ml. of them was introduced in 300 ml. glass beakers.

A group of about 30 fullgrown larvae of northern house mosquitoes was liberated therein and left to stand for 24 hours. Thereafter number of killed larvae was examined to determine mortality. The result is shown in Table 6.

TABLE 6.—MORTALITY (PERCENT) AFTER 24 HOURS

| Insecticidal composition | Test concentration (p.p.m.) | | |
|---|---|---|---|
| | 0.1 | 0.3 | 1.0 |
| Emulsifiable concentrate in Example 14 | 35 | 84 | 98 |
| Emulsifiable concentrate in Example 18 | 29 | 80 | 95 |
| Emulsifiable concentrate in Example 19 | 15 | 51 | 82 |

Example 29

Five hundred milligrams of granules obtained in Example 16 was dropped in 10 liters of water placed in a 14 liter-volume polyethylene backet. After 1 day, fullgrown larvae of northern house mosquitoes were liberated therein. It was found that 100% of larvae was killed within 24 hours.

Example 30

Aerosol obtained in Example 17 was atomized for 1 second in a 0.343 m.$^3$ glass chamber where about 20 houseflies (adult) had liberated. Number of knocked down flies was observed relative to the lapse of time for 10 minutes. Thereafter, only knocked down flies were gathered, transferred to another observation cage and given feed. Mortality was calculated by observing killed flies after 24 hours. The result is shown in Table 7.

TABLE 7

| Insecticidal composition | Atomized amount (mg.) | Knock-down (percent) ratio relative to the lapse of time | | | | | Mortality (percent) after 24 hours |
|---|---|---|---|---|---|---|---|
| | | 38″ | 1′15″ | 2′30″ | 5′ | 10′ | |
| Aerosol in Example 17 | 670 | 2 | 16 | 32 | 51 | 80 | 61 |

Example 31

The dust obtained in Example 21 was uniformly scattered on the bottom of a high glass Petri dish having a 14 cm. diameter at a rate of 2 g./m.$^2$. Butter was smeared on the side wall leaving about 1 cm. from the bottom non-smeared.

A group of 10 german cockroaches was liberated therein and exposed continuously to the dust for 10 minutes, and number of knocked down cockroaches was observed.

Thereafter the knocked down cockroaches were taken out, transferred to another vessel, and number of killed cockroaches was observed after 3 days.

The result is shown in Table 8.

TABLE 8

| Insecticidal composition | Knock-down (percent) ratio after 24 hours | Mortality (percent) after 3 days |
|---|---|---|
| Dust in Example 21 | 100 | 100 |

What we claim is:

1. A cyclopropanecarboxylic acid ester represented by the general formula of

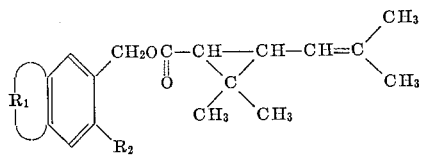

wherein $R_1$ is an alkylene residue of 3 or 4 carbon atoms and $R_2$ is hydrogen atom or a lower alkyl radical having from 1 to 3 carbon atoms.

2. A compound represented by a formula of

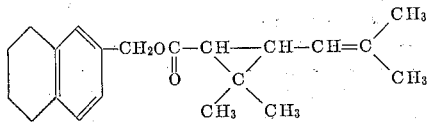

3. A cyclopropanecarboxylic acid ester as set forth in claim 1 wherein $R_1$ is an alkylene radical having 3 carbon atoms and $R_2$ is an alkyl radical having from 1 to 2 carbon atoms.

4. A cyclopropanecarboxylic acid ester represented by the formula

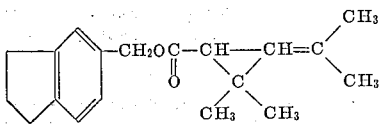

5. A cyclopropanecarboxylic acid ester as set forth in claim 1 wherein $R_1$ is an alkylene radical having 4 carbon atoms and $R_2$ is an alkyl radical having from 1 to 3 carbon atoms.

References Cited

UNITED STATES PATENTS

| | | | |
|---|---|---|---|
| 2,857,309 | 10/1958 | Barthel | 260—468 |
| 2,992,269 | 7/1961 | Harrom et al. | 260—468 |

OTHER REFERENCES

Migrdichian: "Organic Synthesis," vol. 1 (1957) pp. 311, 319, 323 and 326.

JAMES A. PATTEN, *Primary Examiner.*

P. KILLOS, *Assistant Examiner.*